United States Patent [19]

Mastak

[11] 4,132,305
[45] Jan. 2, 1979

[54] METHOD AND APPARATUS FOR REMOVING ARTICLES FROM BETWEEN LOAD PATTERNS IN A BULK PALLETIZER

[75] Inventor: Ned J. Mastak, Tavares, Fla.

[73] Assignee: Acme Conveyor Company, Sanford, Fla.

[21] Appl. No.: 845,034

[22] Filed: Oct. 25, 1977

[51] Int. Cl.² .............................................. B65G 47/26
[52] U.S. Cl. ...................................... 198/432; 53/531;
198/425; 198/954; 214/6 N
[58] Field of Search ............... 198/425, 432, 419, 418,
198/954, 444, 347; 214/6 N; 53/159

[56] References Cited

U.S. PATENT DOCUMENTS 3,645,410  2/1972  Powell ............................. 198/418 X

FOREIGN PATENT DOCUMENTS 2327342  12/1974  Fed. Rep. of Germany ........... 198/432

Primary Examiner—Robert W. Saifer
Assistant Examiner—Douglas D. Watts
Attorney, Agent, or Firm—James & Franklin

[57] ABSTRACT

The sequential formation of load patterns of certain configurations requires the removal from the pattern forming area of odd containers from between the patterns, as the patterns are automatically formed. To accomplish this, a reject conveyor, directed transversely to the direction of movement of the main feed conveyor, is located in the pattern forming area at the interface between the formed pattern and the pattern next to be formed. The containers are conveyed into the pattern forming area by the main conveyor such that the trailing edge of a first set of containers (formed load pattern), the leading edge of a second set of containers (load pattern next to be formed) and a third set of containers, comprising the containers between the load patterns (to be rejected), are situated on the reject conveyor. Retractable means are provided for engaging the containers in the first and second sets, respectively and for moving same in opposite directions along the main conveyor to locations remote from the reject conveyor. Thereafter, the reject conveyor is actuated to remove the third set of containers from the pattern forming area.

40 Claims, 6 Drawing Figures

METHOD AND APPARATUS FOR REMOVING ARTICLES FROM BETWEEN LOAD PATTERNS IN A BULK PALLETIZER

The present invention relates to bulk palletizers and more particularly to a bulk palletizer having capability for removing odd articles from between load patterns.

A palletizer is a material handling apparatus which automatically accepts objects, such as cartons or the like, from an assembly line or other source, arranges the objects in a predetermined pattern to form a tier of cartons and loads successive tiers on a pallet to form a cubic load, which is subsequently removed for warehousing or shipping. A bulk palletizer is a palletizer which accepts individual articles, such as round containers (bottles or cans) and arranges the containers in a pattern to form a tier. The tiers are then successively loaded on a pallet which is thereafter removed.

The nature of bulk palletizing of containers requires that the fullest use be made of available space so as to reduce the warehousing and shipping costs of the bulk load. Thus, the bulk palletizer must form the maximum possible number of containers (bottles or cans) into a mass pattern inside a rectangular area (normally 44" by 56") and, by stacking successive patterns, create a cubic load. When palletizing round containers, depending upon the diameter of the containers, a greater or lesser number of containers will be able to be fit within the rectangular load pattern. To ensure that the greatest number of containers (regardless of the diameter thereof) are situated within the rectangular pattern, the pattern of containers is made up of a plurality of rows and the adjacent rows of containers are displaced with respect to each other such that the containers in one row are partially "nestled" between adjacent containers in the adjacent row, with the leading end of one row being offset, by a distance equal to one-half the diameter of a container, from the leading end of the adjacent row.

The pattern of containers is formed inside a pattern forming carriage located in the pattern forming area of the bulk palletizer. The dimensions of the carriage are preset to provide the maximum number of rows of maximum number of containers per row, comparable with the diameters of the containers and outer dimensions of the rectangular pattern. Thus, the size of the individual containers and the outer dimensions of the pattern determine the configuration. The pattern may comprise rows of equal numbers of containers per row, adjacent rows being displaced by the distance of half the diameter of a container. However, in some instances, the container size dictates that adjacent rows of containers be of different lengths. In order to achieve rows of different lengths, the extra or odd containers, which form no part of the patterns, must be removed. With the former configuration, the pattern can be palletized directly, there being no containers remaining on the conveyor which must be removed from between the adjacent patterns as the patterns are formed. However, in the latter situation, the odd or extra container in every other row of the pattern must be removed from the pattern forming area before the next area pattern can be formed.

Conventionally, the pattern forming carriage comprises a "U" shaped member which straddles the longitudinal center line of the bulk palletizer. Containers are feed to the pattern forming area parallel to the longitudinal center line and are conveyed in mass into the opened side of the pattern forming carriage by means of a mesh steel belt conveyor of 48" nominal width. The leading containers form the pattern previously described by abutting against the leading (closed) edge of the pattern forming carriage, which is shaped appropriately with alternating "hills" and "valleys" spaced in accordance with the diameters of the containers to the palletized. The back end of the carriage is equipped with retractable blades which engage the containers to form the trailing edge of the pattern. Similar separate retractable hold back blades are used to hold back the containers which will consistute the next pattern to be formed, as the formed pattern is moved to the loading area.

Once the blades on the pattern forming carriage are lowered into position, the pattern forming carriage, with its layer of containers, is moved parallel to the center line of the machine from the pattern forming area over the mesh belt conveyor to a position in a bulk loading area wherein the pattern is placed on the pallet. The carriage is then returned to the pattern forming area, the blades thereon and the hold back blades retracted, the containers which will form the next pattern are fed into the pattern forming carriage and the process is repeated.

In conventional bulk palletizers, the unwanted between pattern containers are removed through the use of a table top reject conveyor mounted transverse to the longitudinal center line of the mesh belt at a location directly under the leading end of the pattern forming carriage. As the pattern forming carriage, with its layer of containers is moved towards the bulk loading area, the between pattern containers to be removed are freed to be conveyed approximately 56" by the mesh belt towards a reject conveyor. The reject conveyor conveys the articles clear of the pattern forming area and back into the infeed side of the palletizer.

The location of the reject conveyor at the leading or forward end of the pattern forming carriage has serious drawbacks because of tippage problems and reduced speed of the overall operation. The containers to be removed are moving on the mesh belt conveyor in a direction parallel to the longitudinal center line of the machine. As same enter onto the reject conveyor, moving transverse to the movement of the mesh belt and at a different speed therefrom, the containers often tip because of the abrupt change in direction, thereby requiring manual removal from the pattern forming area. Further, operating speeds of the machine are substantially slowed due to the time required for the containers to be removed to travel the 56" distance along the main conveyor to the reject conveyor and then to be moved the 48" distance (in the transverse direction) by the reject conveyor.

It is, therefore, a prime object of the present invention to provide a method and apparatus for removing articles from between load patterns in a bulk palletizer wherein tippage of the containers, as same enter the reject conveyor, is substantially eliminated.

It is another object of the present invention to provide a method and apparatus for removing articles from between load patterns in a bulk palletizer wherein the speed of the pattern forming and loading operations is not substantially adversely affected by the removal of the between pattern containers.

It is a further object of the present invention to provide a method and apparatus for removing articles between load patterns in a bulk palletizer wherein the reject conveyor is situated such that the containers to be removed do not change direction abruptly during the removal process.

It is another object of the present invention to provide a method and apparatus for removing articles between load patterns in a bulk palletizer wherein the removal process can be initiated almost immediately after the movement of the pattern forming carriage towards the loading area is begun.

It is still a further object of the present invention to provide an apparatus and method for removing articles from between load patterns and a bulk palletizer wherein the apparatus consists of simple, relatively inexpensive conventional parts which act reliably together in a relatively maintenance free manner.

In accordance with the present invention, apparatus and method is provided for removing articles between load patterns in a bulk palletizer. The palletizer has a pattern forming area provided with first and second conveyor means. The first conveyor means conveys articles to be palletized to the pattern forming area in a given direction. The second conveyor means conveys articles in a direction transverse to the given direction. The second conveyor means is located in the pattern forming area along the interface between first and second sets of articles (formed load pattern and load pattern next to be formed, respectively) such that the trailing edge of the first set, the leading edge of the second set and the articles therebetween, and thus to be removed, are initially situated on the second conveyor means. Means are provided for engaging and moving the first and second sets, respectively, to locations along the first conveyor means remote from the second conveyor means, such that the actuation of the second conveyor means causes removal from the pattern forming area of the articles between the sets.

The engaging and moving means comprises a first carriage, preferably the pattern forming carriage and a second carriage, which are movable along the first conveyor means in opposite directions. Each carriage has operably mounted thereon article engaging means, preferably in the form of separate sets of spaced retractable blades, which are situated to engage the peripheral containers in the alternate rows in each of the sets, respectively.

After the containers have been conveyed by the first conveyor means into the pattern forming carriage, and the first set of articles has formed a load pattern, the sets of blades comprising the engaging means are lowered into the unretracted positions such that the sets of blades are inserted between the trailing edge of the formed pattern (first set of articles) and the leading edge of the pattern next to be formed (second set of articles). Insertion of the sets of blades is preferably, although not necessarily, accomplished simultaneously. The pattern forming carriage, with the set of blades mounted thereon in the unretracted or retaining position, is moved, along with the containers therein, towards the loading area. The second carriage, with its set of blades in the unretracted or holding position, is moved in the opposite direction such that the leading edge of the pattern next to be formed (second set) is also moved to a position remote from the second conveyor means. Thus, the only articles remaining on the second conveyor means are those between the patterns, which are to be removed from the pattern forming area. Actuation of the second conveyor means causes the articles to be removed from the pattern forming area. The second conveyor means moves in a direction transverse to the direction of movement of the first or main conveyor. The removed articles are subsequently fed to the infeed side of the palletizer.

After the pattern forming means has been emptied by loading the articles therein on the pallet, the pattern forming carriage returns to its original position in the pattern forming area. The retaining blades are retracted. The second carriage is also repositioned and the hold back blades on the second carriage are likewise retracted. The main conveyor is thereafter actuated such that containers are again fed to the pattern forming carriage and the process begins all over again.

To the accomplishment of the above and to such objects as may hereinafter appear the present invention relates to the method and apparatus for removing articles from between load patterns in a bulk palletizer, as set forth in the annexed claims and described in the present specification, taken together with the drawings, wherein like numerals refer to like parts and in which:

Figure 1:
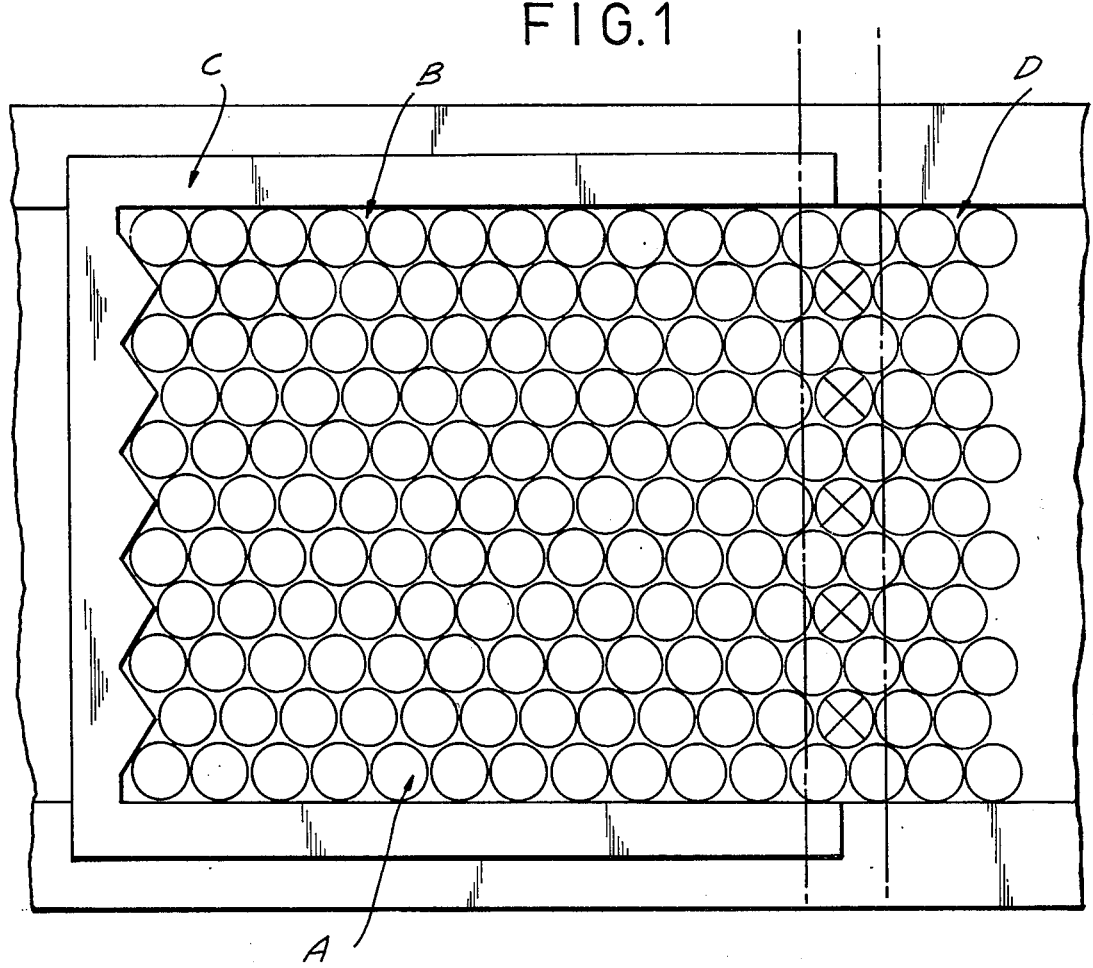
FIG. 1 is a top elevational view of a portion of the pattern forming area of the bulk palletizer showing the load pattern to be formed thereon.

FIG. 1 illustrates a plurality of articles, generally designated A, some of which have been formed into a rectangular load pattern, generally designated B, the boundaries of which are defined by a portion of the pattern forming means, generally designated C. The articles A are containers having round bases, such as bottles or cans. The pattern B formed within pattern forming means C comprises eleven rows of containers, the odd rows comprising twelve containers each and the even rows comprising eleven containers each. Adjacent rows are displaced with respect to each other a distance of one-half the diameter of the container to permit the rows to be "nestled" to save space.

As is readily apparent from FIG. 1, when load patterns having adjacent rows with different numbers of containers are formed from rows of incoming containers, certain containers, designated with an "X" in FIG. 1, are present which belong neither to the pattern B or to the set of incoming containers, generally designated D, which will make up the pattern next to be formed. In order to automatically perform successive pattern forming operations, it is necessary to remove the "X" containers from the pattern forming area. The "X" containers to be removed are situated one in every other row, between the trailing edge of a first set of containers, those within means C, and a second set of containers D, shown to the right of means C in FIG. 1. These "X" containers to be removed therefore form a third set of containers.

Figure 2:
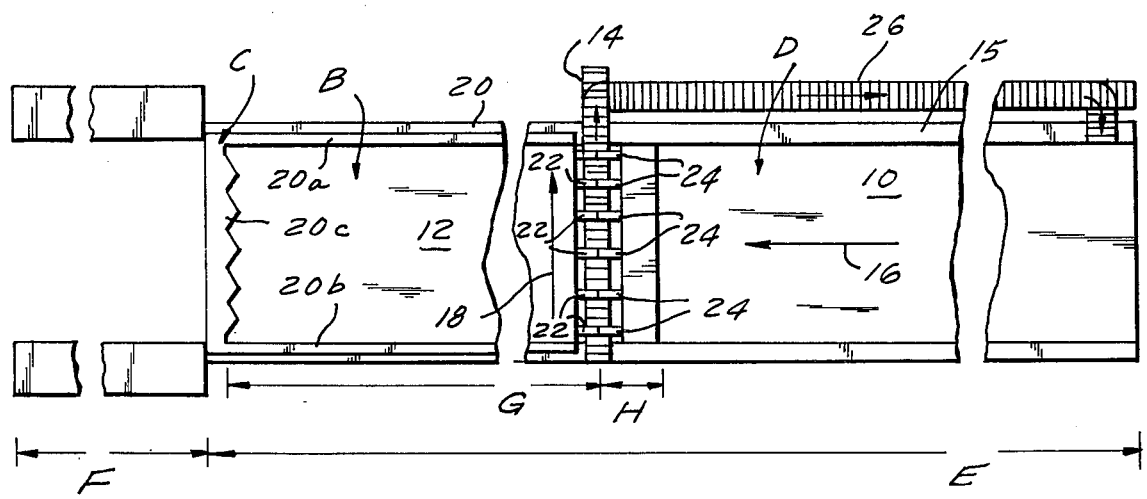
FIG. 2 is a plan view of the pattern forming area of the bulk palletizer showing the retaining blades and hold back blades after insertion between load patterns.

FIG. 2 shows a plan view of the pertinent portion of the bulk palletizer. The portion of the bulk palletizer shown in FIG. 2 is divided into two sections: the pattern forming area, generally designated E and the pattern loading or hoisted area, generally designated F. The pattern forming area E comprises an area G, in which the pattern forming means C is situated to accept incoming containers and a portion H which is the "hold back" area for the containers D next to be formed into a pattern. The main feed conveyor, preferably comprised of a mesh belt of 48" nominal width, is divided into two sections 10, 12 by a reject conveyor 14. Section 10 of the main feed conveyor is located to the right of reject conveyor 14, as seen in FIG. 2 and is provided with upstanding walls 15 on either side to retain the containers thereon and section 12 of the main feed conveyor is located to the left of reject conveyor 14, as shown in FIG. 2.

The main feed conveyor moves the containers along the pattern forming area E towards the pattern forming means C located in area 12 of the main feed conveyor, in the direction of the arrow 16. The reject conveyor 14 moves articles in a direction, shown by arrow 18, which is transverse to the direction of movement of the main feed conveyor. Reject conveyor 14 is located with respect to the main conveyor such that when the pattern forming means C is in position in section 12 of the main feed conveyor, the trailing edge of the first set of containers B (those containers which are within the pattern forming means C), the leading edge the second set of containers D (those containers next to be moved into the pattern forming means) and a third set of containers (designated by "X's" in FIG. 1) which are to be rejected, are situated on reject conveyor 14.

As seen in FIG. 2, the pattern forming means C comprises a "U"-shaped member 20, having parallel side members 20a and 20b extending in the direction of movement of the main feed conveyor, an opened back end and a closed front end 20c. Front end 20c is "scalloped" that is, has a plurality of "hills" and "valleys" therealong so as to shape the load pattern B with adjacent rows being displaced a distance equal to one-half of the diameter of the containers. Member 20 is movable between portion G of the pattern forming area E and the pattern loading or hoist area F, in a manner described in detail below. The pattern forming means C is provided with a plurality of retractable blades 22 mounted hereon which serve to engage the trailing edge of the container set B within member 20 such that when the pattern forming means C is moved towards the pattern loading area F, the entire set of containers B therein is likewise moved.

A second set of retractable blades 24 is situated on a second movable carriage (not shown in FIG. 2) and serve to "hold back" the second set of containers D such that the "X" containers can be removed from the pattern forming area E by reject conveyor 14. Hold back blades 24 are moved from the position shown in FIG. 2 to the other side of the "hold back" area H by the movement of the second carriage, as described in detail below.

After blades 22 and 24 are inserted between the first sets of containers B and the second set of containers D, the pattern forming carriage and the second carriage are moved in opposite directions along the main feed conveyor such that the trailing edge of the first set of containers B and the leading edge of the second set of containers D are no longer situated on reject conveyor 14. Thus, only the "X" containers, those to be removed from the pattern forming area, remain on reject conveyor 14. The reject conveyor 14 is thereafter actuated to move the containers thereon in the direction of arrow 18 until same reach an additional conveyor 26, which runs parallel, but in the opposite direction, to the main feed conveyor, such that the removed containers are fed to the input side of the pattern forming area E.

Figure 3:
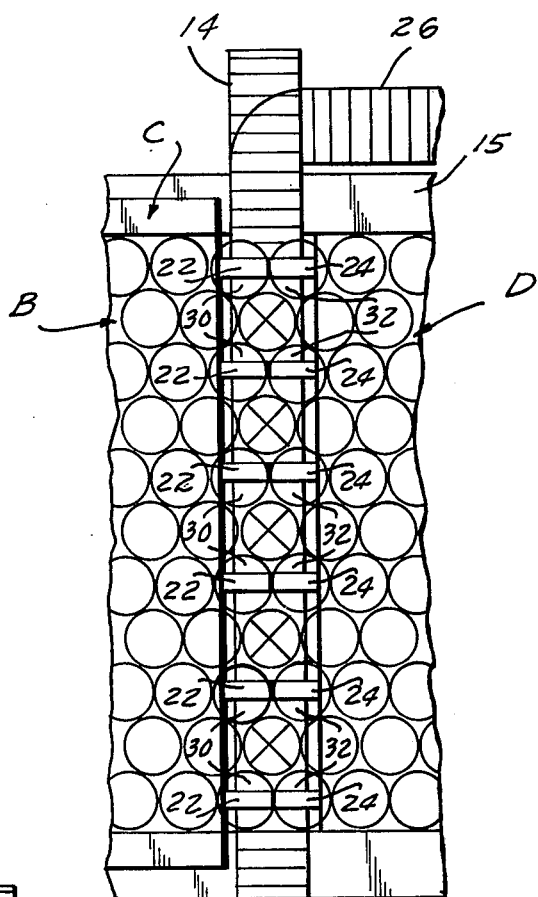
FIG. 3 is an enlarged view of the reject conveyor and retaining blades and hold back blades shown in FIG. 2.
Figure 4:
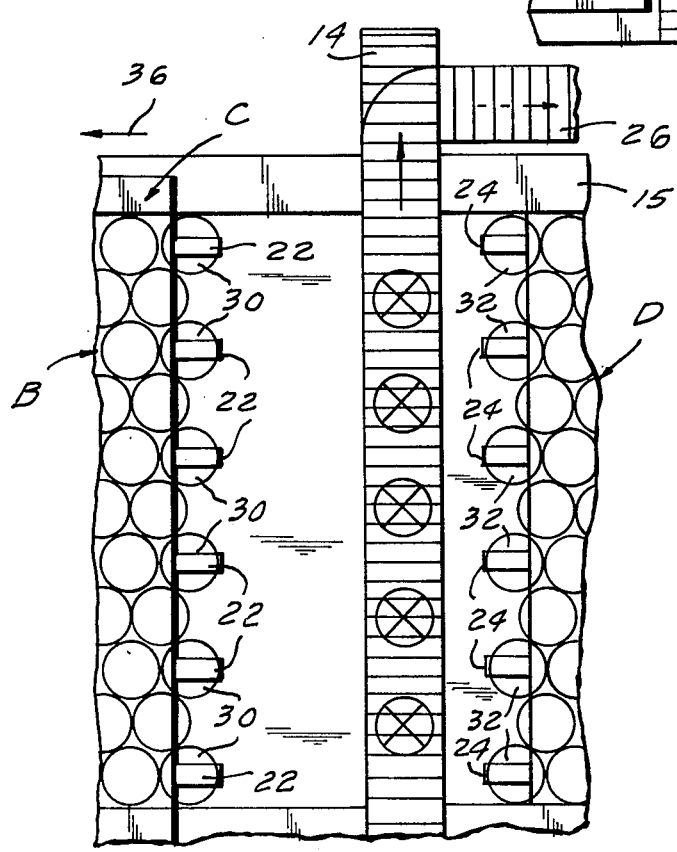
FIG. 4 is a view similar to that shown in FIG. 3 wherein the pattern forming carriage and second carriage have moved to their remote positions.

The movement of the sets of containers B and D is best shown with reference to FIGS. 3 and 4. FIG. 3 shows the containers in the same position as FIG. 2. As shown in FIG. 3, the first set of containers B, includes containers 30, which form the trailing edge thereof, which are situated on reject conveyor 14. It is noted that the containers 30 which form the trailing edge of pattern B are situated in odd rows, those rows being the ones which have the greater number of containers situated therein. Engagement of containers 30 by blades 22 and the subsequent movement of the pattern forming carriage, will cause the movement of all of the containers B within the pattern, even though the containers in the even rows which are not physically engaged by blades 22.

Similarly, containers 32, which form the leading edge of the second set of containers D (that set of containers next to be formed into a pattern) are situated in rows colinear with containers 30. Hold back blades 26 engage only containers 32 in the alternate rows of the leading edge of second set D. However, because of upstanding walls 15 and the nature of the pattern, the engagement with the alternate rows of the leading edge is sufficient to move the entire second set D to a position remote from the reject conveyor 14.

FIG. 4 illustrates a position of the containers after the pattern forming carriage and second carriage have moved in opposite directions to locations remote from reject container 14. In this figure it can be readily appreciated that after the movement of the pattern forming means in the direction of arrow 36 towards the pattern loading area D and the movement, in the opposite direction, of the second carriage, the only containers remaining on reject conveyor 14 are those (designated with an X) containers which must be removed from between patterns to permit the pattern forming operation to take place sequentially. Thus, when the first set B and second set D of containers are in the position shown in FIG. 4, reject conveyor 14 is actuated such that the containers to be removed from the pattern forming area travel transverse to the direction of movement of the main feed conveyor until they reach additional conveyor 26 whereby they are returned to the input side of the main feed conveyor. The initiation of the actuation of reject conveyor 14 takes place a short time after the commencement of movement of the pattern forming means C such that virtually no additional time is required to remove the odd or unwanted containers from between the patterns. It should also be noted that while the first set B of containers is moved, by means of the pattern forming carriage, to the pattern loading or hoist area F, the second set of containers D is moved only a relatively short distance H from the reject conveyor 14.

Figure 5:
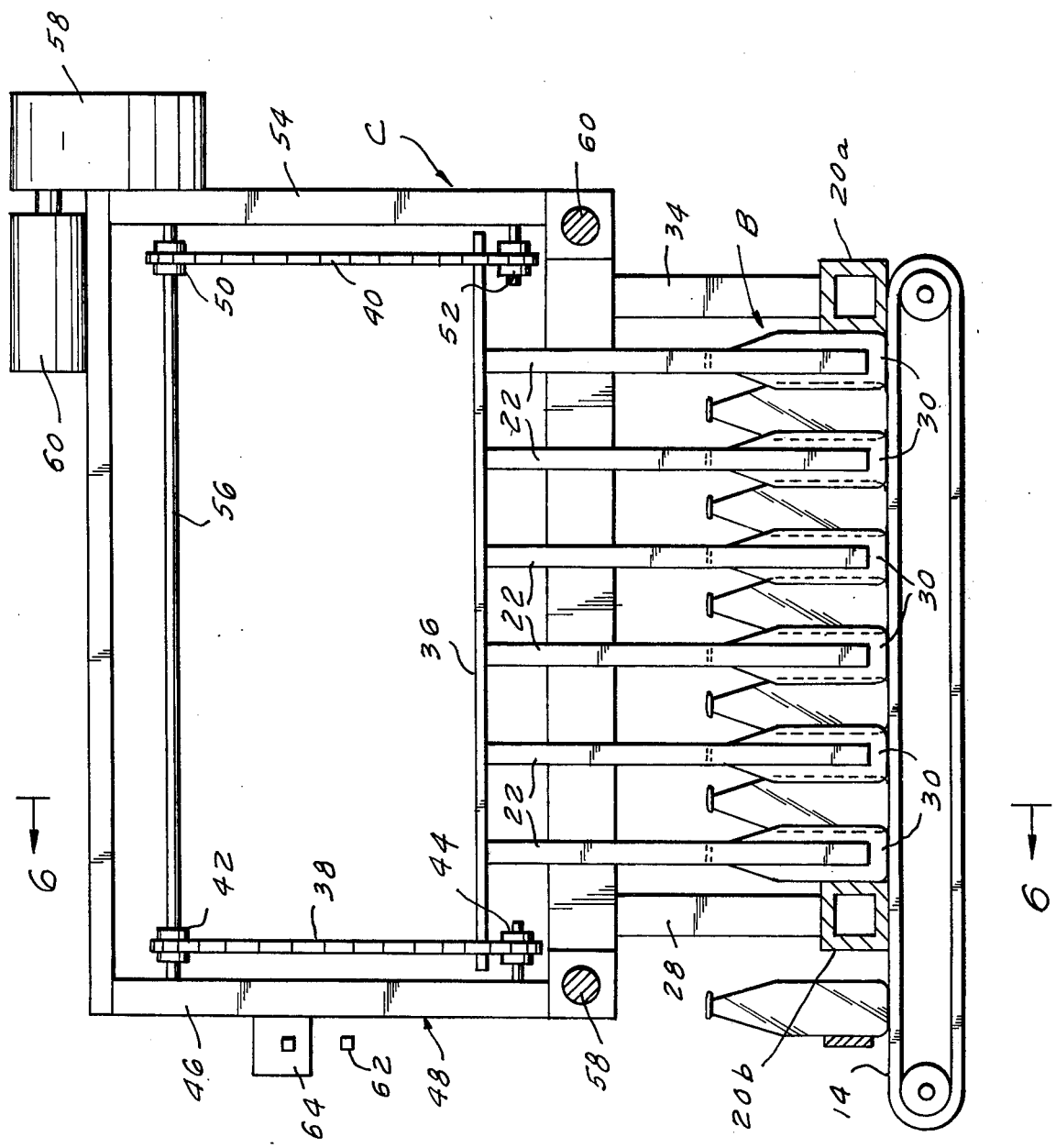
FIG. 5 is a sectional view showing the reject conveyor, pattern forming carriage and retaining blades.

The structure of the pattern forming means is illustrated in FIG. 5. In FIG. 5 the two parallel members 20a and 20b of member 20 are shown in cross-section with the first set of articles B therebetween. The trailing edge of set B, which comprises containers 30, is engaged by the plurality of blades 22, as the pattern forming means C is moved in a direction into the figure and thus away from reject conveyor 14.

Blades 22 extend downwardly from a cross member 36 which is connected at either end thereof to chains 38, 40 respectively. Chain 38 forms a loop around spockets 42 and 44 which are journaled into vertical member 46 of a frame generally designated 48. In a similar fashion, chain 40 forms a loop around spindles 50 and 52 journaled into vertical member 54 of frame 48. Spockets 44 and 52 are connected by means of a shaft 56 which forms the output shaft of a gear reduction box 58. Gear reduction box 58 is driven by an electric motor 60 so as to rotate shaft 56 and thus move chains 38 and 40 such that member 36, and the blades 22 connected thereto, can be moved vertically between the unretracted position, shown in FIG. 5 and retracted position wherein the blades 22 no longer engage containers 30. Thus, by acuation of motor 60, blades 22 can be moved between retracted and unretracted positions.

Member 20 is operably connected, at the front end thereof, to frame 48 by members 28, 34 such that member 20 moves along the main feed conveyor as the frame 48 is moved. Frame 48 is situated on a pair of rods 58, 60 which extend in a direction parallel to the movement of the main feed conveyor. An endless chain 62 extends parallel to rods 58 and 60 along side of frame 48 and is connected thereto by a connecting block 64 mounted on vertical member 46.

Figure 6:
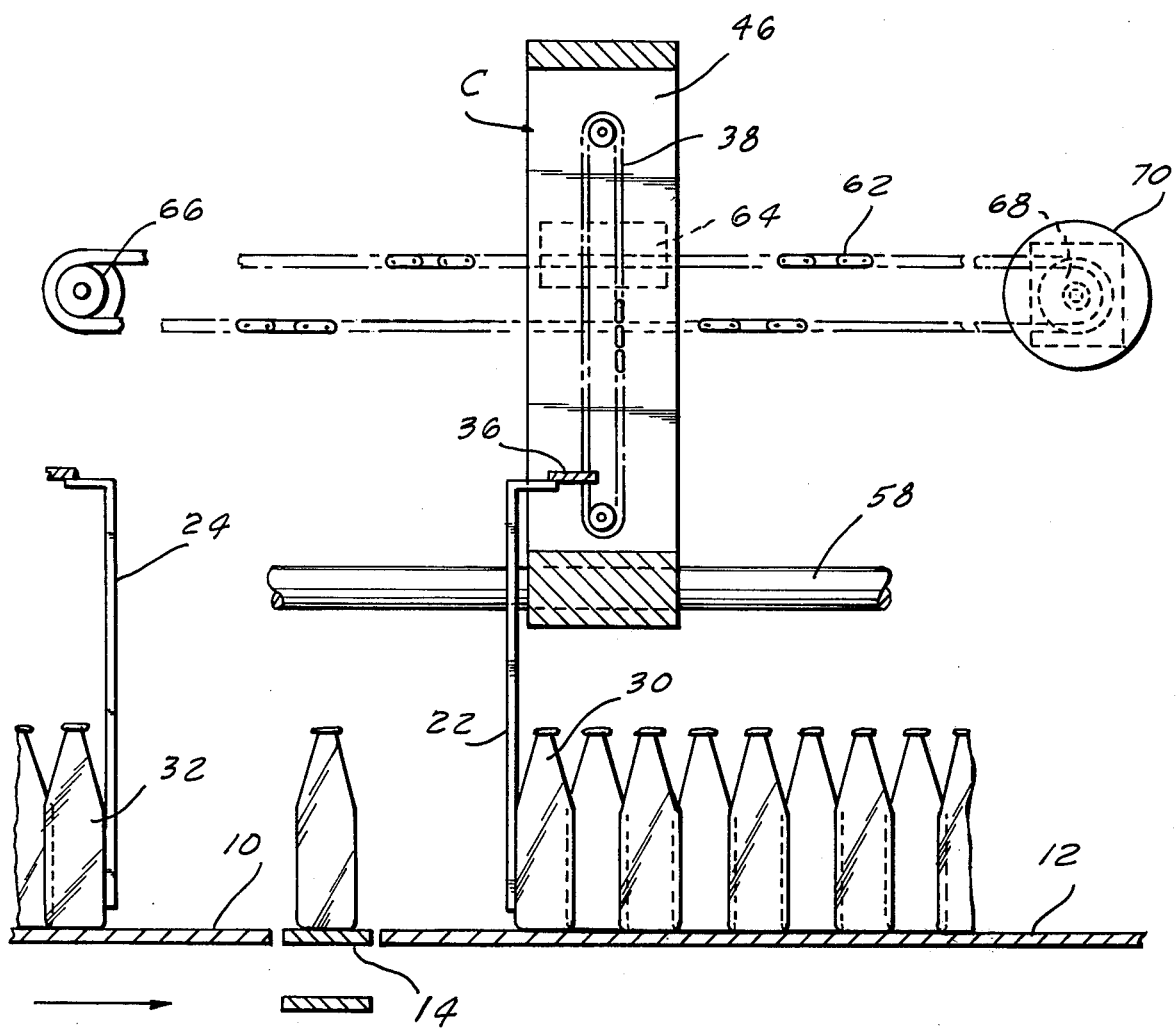
FIG. 6 is a view taken along line 6—6 of FIG. 5.

As shown in FIG. 6, chain 62 travels around sprockets 66, 68, above the conveyor, sprocket 68 being connected to a motor 70. Motor 70 serves to rotate sprocket 68 thereby moving chain 62 and thus frame 48 along rods 58 and 60. Therefore, motor 70 serves to move frame 48 and member 20 connected thereto, along the main feed conveyor from above portion 12 thereof to the pattern loading area F and back.

The second carriage, to which the retractable hold back blades 24 are operably mounted, has the identical structure to that of frame 48 and the components mounted thereto, with the exception of the equivalent of a member 20, which is not associated with the second carriage. Because the structure of the second carriage is identical to frame 48 and the parts mounted thereto, as illustrated in FIG. 5, this second carriage is not illustrated. The second carriage is moved above the main conveyor by a separate motor driven chain (not illustrated), identical to chain 62, but situated on the other side of the conveyor so as not to interfer with chain 62.

FIG. 6 shows a side view of the pattern forming area as the pattern forming carriage C and the second carriage are moved in opposite directions to positions remote from reject conveyor 14. At this time, reject conveyor 14 is actuated to remove the containers thereon. After the containers remaining on reject conveyor 14 have been removed and the first set of articles B have been moved to the pattern loading area F and thus loaded onto the pallet, the pattern forming carriage C with empty member 20 is returned to its initial position on the main feed conveyor 12. Thereafter, the main feed conveyor is actuated to move the second set of articles D into member 20 so as to form the next load pattern. After movement of the main feed conveyor is completed, the trailing edge of the formed load pattern, the leading edge of the containers to be formed into the next load pattern and the containers therebetween are again situated on reject conveyor 14. The sets of containers are moved in opposite directions to positions on main feed conveyor remote from reject conveyor 14 and reject conveyor 14 is actuated to remove the odd containers. The cycle keeps on repeating itself until all the patterns are formed and loaded.

It is preferable, although not required, that blade 22 and 24 be inserted between the trailing edge of the formed pattern and the leading edge of the pattern to be next formed, simultaneously. The simultaneous insertion of the blades permits a reduction of time for the operation and in addition eliminates any wearing of the blades caused by relative vertical movement therebetween, when the sets of blades are inserted.

It should therefore be appreciated that the present invention is a method and apparatus for the removal of between pattern containers from the pattern forming area of a bulk palletizer which eliminates tippage and permits the successive formation of load patterns in a reduced time, as compared with prior art devices. Tippage is eliminated by avoiding an abrupt change in direction as the containers enter the reject conveyor. This is achieved by locating the reject conveyor at the back end of the pattern forming means, when same is in the pattern forming position. Reduction of operation time is achieved by permitting the rejected containers to be removed simultaneously with the movement of the pattern forming means towards the pattern loading area, such that virtually no additional time is required for the rejection procedure.

While only a single preferred embodiment of the present invention is illustrated herein, it is obvious that many modifications and variations can be made thereon. It is intended to cover all of these modifications and variations which fall within the scope of the present invention as defined by the following claims.

We claim:

1. A method for removing articles between sets of articles to be formed into load patterns in a bulk palletizer of the type having a pattern forming area, first means for conveying articles in a given direction to the pattern forming area, second means for conveying articles from the pattern forming area in a direction transverse to said given direction, the second conveying means being situated in the pattern forming area along the interface between first and second sets of articles, retractable means for engaging the articles in the first and second sets of articles, respectively and means for moving the engaged sets along the first conveyor means, comprising the steps of:

conveying articles into the pattern forming area along the first conveying means such that the articles forming the trailing edge of the first set, the leading edge of the second set and the articles therebetween are situated on the second conveyor means, positioning the engaging means between the trailing edge of the first set and the leading edge of the second set, moving the first and second sets respectively to positions remote from the second conveyor means, and conveying the articles remaining on the second conveyor means in a direction transverse to the given direction to remove same from the pattern forming area.

2. The method of claim 1 wherein the step of positioning the engaging means comprises the steps of:

locating the engaging means above the second conveyor means and, inserting the engaging means between articles in alternate rows of the trailing edge of the first set and the leading edge of the second set.

3. The method of claim 2 wherein the engaging means comprises two groups of blades and wherein the step of inserting comprises the step of positioning both groups of blades between the trailing edge of the first set and leading edge of the second set and wherein the step of moving the first and second sets comprises separating the groups of blades so as to move the respective sets to a position wherein the trailing edge of the first set and the leading edge of the second set are remote from the second conveyor means.

4. The method of claim 1 wherein the moving means comprises a pattern forming means and wherein the method further comprises the step of forming the first set of articles into a pattern.

5. The method of claim 1 wherein the palletizer has a pattern loading area and wherein the step of moving the first and second sets comprises the step of moving the first set towards the pattern loading area.

6. The method of claim 4 wherein the step of forming the pattern comprises the step of forming the first set of articles into a substantially rectangular pattern.

7. The method of claim 6 further comprising the step of displacing every other row in the pattern, with respect to adjacent rows, a distance equal to one-half the diameter of the container.

8. The method of claim 6 further comprising the step of forming the rectangular pattern of a plurality of rows wherein adjacent rows have different number of articles.

9. The method of claim 1 wherein the articles are round.

10. The method of claim 1 wherein the step of conveying the remaining articles comprises the step of conveying the remaining articles to the input side of the first conveyor means.

11. A method of removing articles between load patterns in a bulk palletizer or the like of the type having a pattern forming area and a pattern loading area, pattern forming means, movable between the pattern forming area and the pattern loading area, with retractable article retaining means located at the rear end thereof, means for conveying articles to the pattern forming area, retractable article holding means movable along the conveying means and article reject means for moving articles to be removed in a direction transverse to the direction of movement of the conveyor means, the reject means being situated at the rear end of the pattern forming means, when same is in position in the pattern forming area, comprising the steps of:
positioning the pattern forming means in the pattern forming area with the article retaining means in the retracted position;
positioning the article holding means in the retracted position above the pattern forming area;
conveying the articles to the pattern forming area such that a first set of articles, formed into a pattern by the pattern forming means, are positioned with the trailing edge thereof situated on the reject means, a second set of articles, to be formed into the next pattern, are positioned with the leading edge thereof situated on the reject means and a third set of articles, located between the first and second sets, are positioned on the reject means;
moving the retaining means into the unretracted position to engage the first set of articles;
moving the holding means into the unretracted position to engage the second set of articles;
moving the pattern forming means, and thus the first set of articles, to a position remote from the article reject means;
moving the holding means, and thus the second set of articles, to a position remote from the article reject means, and
actuating the reject means to move the third set of articles in a direction transverse to the direction of the conveyor means.

12. The method of claim 11 wherein the step of moving the pattern forming means comprises the step of moving the pattern forming means towards the loading area.

13. The method of claim 12 further comprising the steps of:
retracting the holding means;
repositioning the pattern forming means in the pattern forming area;
retracting the retaining means; and
conveying the second set of articles into the pattern forming means.

14. The method of claim 11 wherein the steps of moving the retaining means to the unretracted position and moving the holding means to the unretracted position occur simultaneously.

15. The method of claim 11 wherein the step of actuating the reject means comprises the step of feeding the third set of articles to input side of the palletizer.

16. The method of claim 11 wherein the retaining means and holding means comprises groups of movable blades and wherein the steps of moving the retaining means into the unretracted position and moving the holding means to the unretracted position comprise the step of inserting the groups of blades between the trailing edge of the first set and the leading edge of the second set.

17. The method of claim 11 wherein the retaining means engages only articles in alternate rows of the trailing edge of the first set.

18. The method of claim 11 wherein the holding means engages only articles in the alternate rows of the leading edge of the second set.

19. The method of claim 17 wherein the holding means engages only articles in the alternate rows of the leading edge of the second set.

20. The method of claim 19 wherein the rows engaged by the retaining means are colinear with the rows engaged by the holding means.

21. The method of claim 17 wherein the articles to be removed are situated only in nonengaged rows.

22. Apparatus for removing articles between sets of articles to be formed into load patterns in a bulk palletizer or the like comprising a pattern forming area, first and second conveyor means, said first conveyor means conveying articles in a given direction to said pattern forming area, said second conveyor means conveying articles in a direction transverse to said given direction and being located in said pattern forming area along the interface between first and second sets of articles such that the trailing edge of the first set, the leading edge of said second set and the articles to be removed are initially situated on said second conveyor means and means for engaging and moving said first and second sets respectively to locations remote from said second conveyor means such that actuation of said second conveyor means causes removal from the pattern forming area of the articles between said sets.

23. The apparatus of claim 22 wherein said engaging and moving means comprises a first carriage, retractable article retaining means operably mounted on the rear portion of said first carriage, means for moving said first carriage along said first conveyor and means for moving said retaining means between an unretracted position wherein the trailing edge of said first set is engaged and a retracted position wherein said retaining means are remote from said articles.

24. The apparatus of claim 23 wherein said engaging and moving means further comprises a second movable carriage, retractable holding means operably mounted on said carriage, means for moving said second carriage along said first conveyor means and means for moving said holding means between an unretracted position wherein the leading edge of said second set is engaged and a retracted position wherein said holding means are remote from said articles.

25. The apparatus of claim 24 wherein said engaging and moving means further comprises means for moving said first and second carriages in opposite directions.

26. The apparatus of claim 24 wherein said retaining means comprises a plurality of spaced blades.

27. The apparatus of claim 26 wherein said holding means comprises a plurality of spaced blades.

28. The apparatus of claim 27 wherein the blades of said retaining means and the blades of said holding means form pairs of blades.

29. The apparatus of claim 28 wherein said pairs of blades are simultaneously insertable between said first and said second sets.

30. The apparatus of claim 22 further comprising additional conveyor means operably connecting the output end of said second conveyor means with the input end of said first conveyor means.

31. Apparatus for removing articles between load patterns in a bulk palletizer or the like of the type having a pattern forming area comprising first means for conveying the articles to the pattern forming area, second means for conveying the articles to be removed from the pattern forming area, the articles in the pattern forming area being seperated into a first set, comprising articles forming a first pattern, a second set, comprising articles to be formed into a second pattern and a third set, comprising articles between said first and second patterns, said second conveying means being situated with respect to the first conveyor means such that the trailing edge of the first pattern, the leading edge of said second pattern and said third set of articles are initially located thereon, first retractable means for engaging the trailing edge of said first set of articles and second retractable means for engaging the leading edge of said second set of articles, means for moving said first and second retractable means in opposite directions so as to remove said trailing edge of said first set and said leading edge of said second set from said second conveyor, and means for actuating said second conveyor means to move said third set of articles in a direction transverse to the direction of movement of said first conveyor means such that said third set of articles is removed from the pattern forming area.

32. The apparatus of claim 31 further comprising a first movable carriage upon which said first retractable means are operably mounted.

33. The apparatus of claim 32 wherein said first retractable means are mounted on the rear of said first carriage.

34. The apparatus of claim 32 wherein said first carriage comprises pattern forming means.

35. The apparatus of claim 32 further comprises a second movable carriage upon which said second retractable means are operably mounted.

36. The apparatus of claim 34 wherein said pattern forming means forms a substantially rectangular pattern.

37. The apparatus of claim 36 wherein said pattern comprises a plurality of rows with adjacent rows having different numbers of articles therein.

38. The apparatus of claim 36 wherein the leading edge of said pattern is not the mirror image of the trailing edge thereof.

39. The apparatus of claim 37 wherein said first and second engaging means engage only alternate rows of articles.

40. The apparatus of claim 31 further comprising third conveyor means operably connecting the output end of said second conveyor means with the input end of said first conveyor means.

* * * * *